March 12, 1963   K. M. ALLEN ETAL   3,080,961
REVERSING VIBRATING CONVEYOR
Filed Sept. 16, 1960   2 Sheets-Sheet 1

INVENTORS
KENNETH M. ALLEN
CHESTER H. HARPER
BY Buckhorn, Cheatham & Blore
ATTORNEYS March 12, 1963  K. M. ALLEN ETAL  3,080,961
REVERSING VIBRATING CONVEYOR
Filed Sept. 16, 1960  2 Sheets-Sheet 2

INVENTORS
KENNETH M. ALLEN
CHESTER H. HARPER
BY Buckhorn, Cheatham & Blore
ATTORNEYS United States Patent Office 3,080,961
Patented Mar. 12, 1963

3,080,961
REVERSING VIBRATING CONVEYOR
Kenneth M. Allen and Chester Harvey Harper, Newberg, Oreg., assignors to Allen-Harper, Inc., Newberg, Oreg., a corporation of Oregon
Filed Sept. 16, 1960, Ser. No. 56,394
8 Claims. (Cl. 198—220)

Our present invention comprises an improvement upon the vibrating conveyors described and claimed in our prior Patent No. 2,899,044, issued August 11, 1959, with particular reference to the modification disclosed in FIGS. 10 to 15, inclusive, of said patent.

The vibrating conveyor of the above-identified prior patent is highly satisfactory in most respects, and achieves its principal object of conveying fragile articles such as berries and fruit without bruising them. In the identified modification means are provided whereby the direction of feeding movement may be reversed, and the amplitude of feeding motion may be changed, by shifting the position of the lever 48 disclosed in FIG. 10 of the patent, with resultant shifting of links 39. However, as will be readily apparent from inspection of FIG. 10, the shifting of the links 39 for effecting reversal or degree of feeding results in several unfavorable results, principally that the position of the conveying surface 37 with respect to the supporting frame is altered, and the belt 67 driving the unbalanced rotor 52 is either slackened or tightened to such an extent as to require repositioning of the driving motor 62 and its support 63. As long as the links 39 remain inclined in one direction, the amplitude of feeding movements could be reasonably varied without necessarily requiring adjustment of the driving motor position or shifting of the frame. However, if reversal of direction of feeding movement is to be accomplished, it usually becomes necessary to shift the frame in order that the conveying surface 37 could have an end close to some other conveying surface, table or machine, and it also usually becomes necessary to reposition the driving motor 62. The first inconvenience is particularly disturbing since shifting the entire machine is often difficult to accomplish, and the second inconvenience is equally disturbing since it means time consuming shut-downs of the conveyor. As a result the reversible feature of the machine of said prior art patent is often practically useless and the machine is often practically limited to installations wherein feeding in one direction at a relatively constant rate is to be accomplished.

The principal object of the present invention is to provide a machine having all of the mode of operation and advantageous features of the prior patent machine, with the additional advantages that the direction of feeding movement may be reversed instantly or the amplitude of feeding movement in either direction may be changed instantly, and the relative position of the conveying surface and the supporting frame is not thereby changed in any respect so that the machine always remains usefully close to other conveyors, tables or machines, and no resetting of the position of the driving motor is ever required.

A further object of the present invention is to provide a material-advancing mechanism which can be used as a valve for the feeding of powdered, granular or other discrete materials, where the same are soft, such as fruit, or hard, such as grain and small fabricated objects. By the use of the present invention the flow of any such material may be instantly stopped when desired or necessary.

A further object of the present invention is to provide a machine for feeding discrete materials which may operate as a switch for causing materials to flow along alternate paths.

A further object of the present invention is to provide a machine for feeding discrete materials which may act as a modulating feeder, for instance, to provide a rapid flow for bulk filling of a container and decreasingly slower flow for final filling of the container to exact weight.

The objects and advantages of the present invention will be more readily apparent from inspection of the accompanying drawings, taken in connection with the following specification, wherein like numerals refer to like parts throughout.

Figure 1:
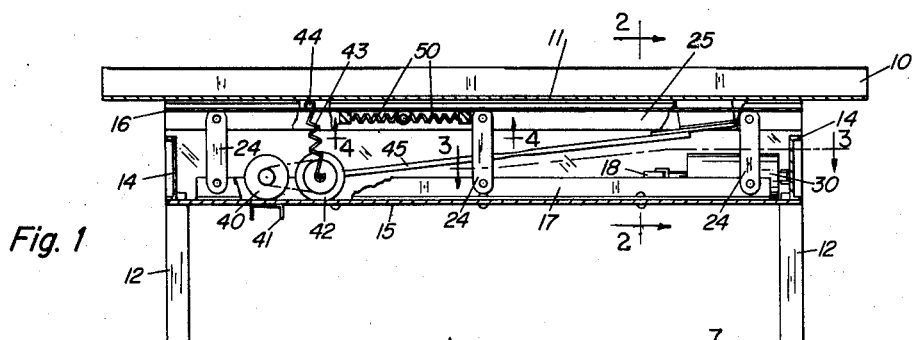
FIG. 1 is a vertical section through a machine embodying the present invention, the view being taken substantially along the line 1—1 of FIG. 2.
Figure 2:
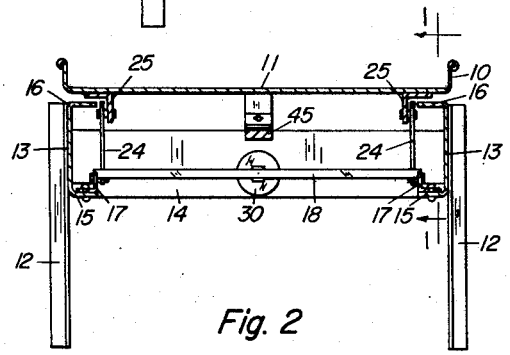
FIG. 2 is a vertical section taken substantially along line 2—2 of FIG. 1.

Referring to FIGS. 1 to 5, inclusive, the machine comprises a conveying element 10 having an upwardly facing conveyor surface 11. In most installations the element 10 is in the form of a wide, shallow trough, as illustrated, the trough having a wide, flat bottom defining the surface 11. With such a device berries, small fruit and the like may be fed longitudinally of the machine in either direction, the articles spreading themselves out over the surface of the table so that they may be inspected and sorted while progressing. It is to be appreciated, however, that the conveying element may comprise a screen, or a narrow trough, or have a curved cross-section, or comprise a flat table having stationary guard rails along the edges thereof, each of such or other forms constituting a conveying element having an upwardly facing surface for receiving material to be conveyed.

The conveying element is supported upon a main frame and other intervening elements, the main frame comprising a plurality of upright legs 12, a pair of longitudinal side channels 13, and a pair of transverse end channels 14, all rigidly affixed together, and any suitable cross-bracing (not shown). Each of the longitudinal channels 13 has its central web upright and is so positioned that the lower flange 15 and the upper flange 16 thereof extend inwardly. The lateral longitudinal portions of the conveying element 10 may overlie and are spaced from the upper flanges 16.

A subframe is supported on the main frame for adjusting movement relative thereto in the longitudinal direction, or direction of feeding movement, of the conveying element. The subframe comprises a pair of longitudinal angle bars 17 at the sides, and suitable transverse elements such as bar 18 and other cross-bracing members (not shown). Each longitudinal angle bar 17 has one leg vertical and spaced inwardly from the web of the channel bar 13 and its other leg 19 extending outwardly and resting upon the upper surface of the inwardly extending flange 15 of the longitudinal channel bar 13 adjacent thereto. The subframe is guided for longitudinal adjusting movement by headed guide pins 20 fixed to the flanges 15 and passing through elongated, longitudinally directed slots 21 in the legs 19. A plurality of upright, parallel links 24 are pivotally connected at their lower ends to the upwardly extending legs of the angle bars 17, and at their upper ends are pivotally connected to the downwardly extending legs of angle bars 25 affixed to the lower surface of the conveying element 10 and extending longitudinally thereof, the bars 25 not only serving as convenient means for attaching the upright links to the conveying element, but also as means for stiffening the conveying element. The relative positioning of the guide members 20, slots 21 and upright links 24, as such that the links may be adjustably positioned normal to the conveying surface 11 or inclined in either direction in the longitudinal or feeding direction of the conveying surface.

Figure 5:
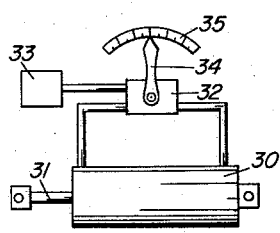
FIG. 5 is a schematic diagram of a means for effecting adjustment of the machine.

Adjustment of the direction and extent of inclination of the links 24 may be accomplished instantly by means of an extensible device imposed between the main frame and the subframe, such device being herein illustrated as a double-acting cylinder 30 and piston 31 associated therewith, the device extending longitudinally of the machine and lying horizontally between an end channel 14 of the main frame and the crossbar 18 of the subframe, the opposed ends of the piston and cylinder device being suitably attached to the respective members. Positioning of the subframe is determined by admitting fluid under pressure to one end of cylinder 30 and coextensively releasing fluid from the opposite end thereof under control of a positioning valve 32 connected to the opposite ends of the cylinder and to a source 33 of pressure fluid, as schematically illustrated in FIG. 5. The valve 32 may be located in any convenient position where the valve operating element 34 may be reached by an operator. The element 34 may also conveniently serve as a pointer to indicate on a scale 35 the inclination of the links 24. The scale 35 may be graduated in degrees of inclination, or may be calibrated to indicate the amplitude of feeding movement or speed of conveying. Many such "follow-up" control valves and associated systems are well known in the art, hence details thereof are not herein illustrated. It is obvious that by such means the direction of feeding movement and the amplitude or speed of feeding movements of the surface 11 may be instantly set as desired, and that the relative position of the conveying element 10 with respect to the fixed frame is not thereby affected.

In order to impart an oscillating motion having a feeding component parallel to the surface 11 to the conveying element 10, any suitable vibrating mechanism may be mounted on the fixed frame and attached to the conveying element without requiring shifting or adjustment thereof when the direction or amplitude of feeding movement is adjusted, since the relative horizontal positioning of the conveying element and the main frame never changes. A convenient form of such motion-imparting means is fully illustrated and described in said prior Patent 2,899,-044, to which reference may be made for a more complete understanding. It is sufficient for the purpose of this invention to point out that this form of motion-imparting means comprises a motor 40 fixed to a channel member 41 which extends laterally between the main longitudinal frame members 13. The motor 40 drives an unbalanced rotor 42 connected thereto through belt and pulley means, the rotor being suspended by a spring 43 having its upper end attached to a crossbar 44 extending between the main frame longitudinal members 13. The axle of the unbalanced rotor is connected to the lower surface of the conveying element 10 through means of a longitudinally extending, flexible connecting rod 45 having one end attached to the conveying element and the other end attached to a strap mounted on the axle of the unbalanced rotor. By such, or any other convenient means accomplishing the same function, such as an electric vibrator mounted directly on the conveying element 10, an oscillating motion having a horizontal, longitudinal feeding component is imparted to the conveying surface 11. The direction of said feeding component may be reversed by reversing the inclination of the links 24, as previously described, and the amplitude of feeding motions, hence the feeding speed, may be varied from zero when the links 24 are vertical, to a desired maximum within the limits of design.

Figure 4:
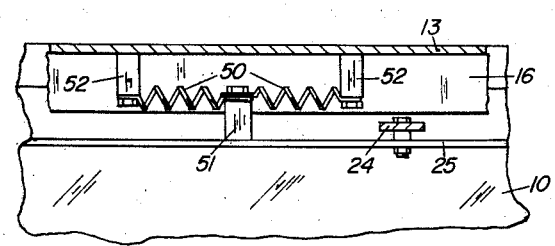
FIG. 4 is a partial section, on an enlarged scale, looking upward from the plane of the line 4—4 of FIG. 1.

A disadvantage of the prior patent machine is that adjustment of the direction and amplitude of feeding movements is effected by shifting the relative points of attachment of the ends, or degree of tension, of a pair of opposed springs mounted between the fixed frame and the conveying element, as illustrated in said patent. Accuracy of control or calibration of the machine is thereby adversely affected. In the present invention this disadvantage is overcome as follows: Resilient means are imposed between the conveying element 10 and the main frame in such manner that the effect of the resilient means is not affected by any adjustment of feeding motion. In the form of the machine illustrated in FIGS. 1 to 5, inclusive, such resilient means comprises a pair of balanced springs 50 placed under tension in the longitudinal direction of the machine at either side, or both sides, thereof. One such pair is illustrated in FIGS. 1 and 4. Each spring 50 is connected at one end to a bracket 51 mounted on the flange of the longitudinal angle bar 25, the other ends of the springs being respectively connected to brackets 52 mounted on the web of the main frame longitudinal channel members 13. The resilient means oppose the feeding movement in either direction but yield to permit such feeding movement and recoil to permit return movements. Since the relative positions of the bracket 51 and the brackets 52 are relatively unaffected by reversing or speed adjustments, the opposing forces of the springs 50 remain unaffected, and hence close calibration of the control mechanism is permitted. Also, longer life of the springs 50 is assured since neither spring is required to operate when highly extended to permit maximum feeding movements, as in the prior machine.

Figure 6:
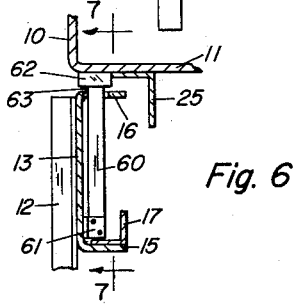
FIG. 6 is a partial sectional view showing a different form of a detail from that embodied in FIG. 4.
Figure 7:
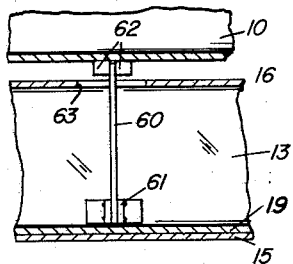
FIG. 7 is a vertical section taken substantially along line 7—7 of FIG. 6.
Figure 3:
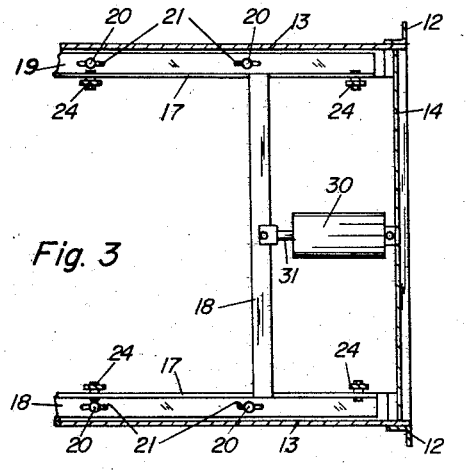
FIG. 3 is a horizontal section, looking downward, taken substantially along line 3—3 of FIG. 1.

The same effect is achieved in the modification disclosed in FIGS. 6 and 7 wherein upright leaf or bar springs 60 are mounted at either or both sides of the machine. The lower ends of the leaf springs may be affixed to the longitudinal frame members 13 by brackets 61 and the upper ends thereof may be slipped between opposed abutment members 62 on the lower surface of the conveying element 10. The horizontal upper flange 16 of the longitudinal frame channels are provided with slots 63 through which the upper ends of the springs 60 extend. Thus, a single leaf or bar spring element achieves all functions of the opposed tension springs of the first modification.

Either form of resilient means is mounted between the fixed frame and the conveying element in such manner as to provide for the oscillating feeding motion of the conveying element and to hold the conveying element at substantially the same average position relative to the fixed frame.

The spring means imposed between the main frame and the conveying element may be omitted in some instances wherein oscillating motion is imparted to the feeding element by means of such nature, in combination with link means so arranged as to guide the conveying element in its oscillations, that the conveying element maintains itself in substantially the same average position relative to said fixed frame as it may be set by the adjusting means.

Figure 8:
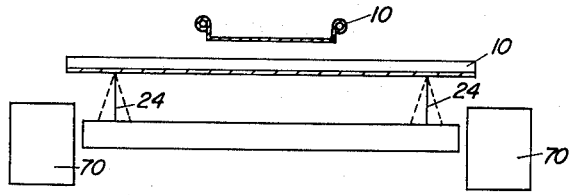
FIG. 8 is a schematic representation of a machine of the present invention utilized as a device for switching the direction of flow of materials.

In FIG. 8 there is schematically shown a machine of the present invention utilized as a switch for shunting materials fed to it by another conveying means, such as another machine of the present invention, from one to the other of a pair of receptacles. The links 24 are schematically represented in full lines in upright positions, in which case material will accumulate on the transversely located conveying element 10. When the links 24 are inclined in either direction, as indicated in dash lines, one or the other of the receptacles 70 will receive material. Manually or automatically controlled means (not shown) may be utilized to determine the direction of inclination of the links 24 in order to switch the material flow from one to the other direction.

Figure 9:
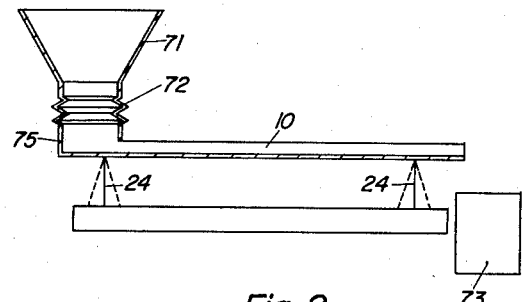
FIG. 9 is a schematic representation of a machine of the present invention utilized as a valve for controlling intermittent feeding of materials.

In FIG. 9 a similar schematic representation shows a conveying element 10 receiving material from a hopper 71 connected to one end of the conveying element through a flexible, bellows type connection 72. No feeding of the material into the receptacle 73 will be accomplished when the links 24 are upright, as illustrated in full line, but feeding will be accomplished when the links are tilted, the rate of flow depending upon the degree of inclination of the links. When the links are inclined in one direction, full feeding into the receptacle will be accomplished, and when inclined in the opposite direction the material will be held in the hopper 71 and against the end wall 75 extending transversely of the end of the conveying element 10. The flexible connection 72 permits the conveying element 10 to rise and fall as determined by the extent of inclination of the links 12, and permits feeding oscillation of the conveying element.

Figure 10:
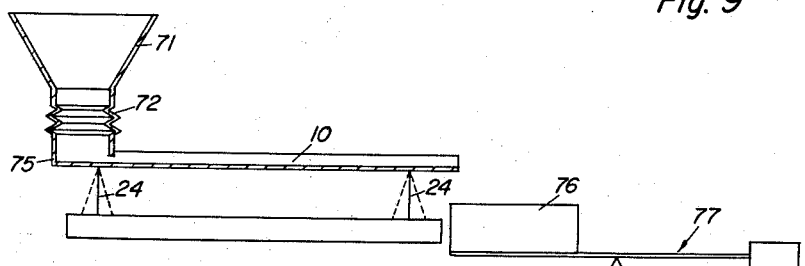
FIG. 10 is a schematic representation of a machine of the present invention utilized as a device for obtaining accurate weight in the filling of receptacles.

In FIG. 10 an arrangement such as illustrated in FIG. 9 is utilized to control the flow of material into a receptacle 76 maintained upon a scale schematically indicated at 77. When the links 10 are fully inclined in the feeding direction, the bulk of the material will be rapidly fed into the receptacle 76. Automatic means (not shown) under control of the scale 77, may be utilized to move the links 24 rapidly toward the upright position as the desired weight is approached. Then the links may be moved gradually to shut off the flow as exact weight is approached, and when exact weight is reached to rapidly reverse the feeding direction so that material is backed up toward the hopper.

Figure 11:
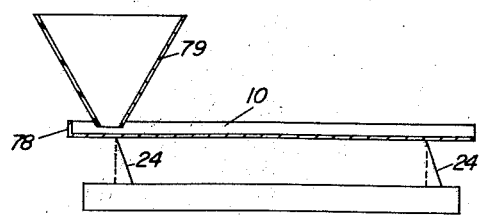
FIG. 11 is a schematic representation of a machine of the present invention utilized as a valve for controlling the flow of materials.

In FIG. 11 a machine of the present invention comprising a conveying element having a back wall 78 is illustrated as feeding material from a rigid hopper 79 having its mouth closely adjacent the upwardly facing bed of the conveying element 10. When the links 24 are inclined, as shown in full line in FIG. 1, powdered or granular material may escape from the hopper and be fed toward the right by the conveying element. When the links 24 are positioned upright, as indicated in dash line, the bed of the conveying element will engage the lower edge of the hopper 79 and cut off the flow of material. Since there is no breeding movement of the conveying element under the latter conditions, the bed of the conveying element will act as a valve to close off the flow of material without annoying scraping of the bed against the hopper.

Figure 12:
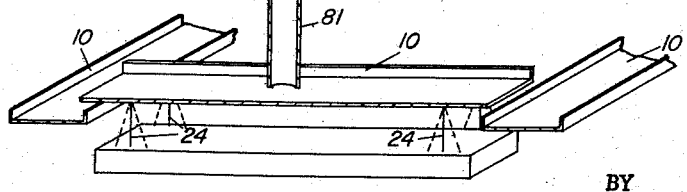
FIG. 12 is a schematic representation of a machine of the present invention utilized both as a valve and as a switch for controlling the flow and direction of flow of materials.

In FIG. 12 a transversely located machine of the present invention is illustrated as comprising a switch for feeding materials to either of a pair of other conveying machines. The transverse machine receives material from a hopper 80 having a rigidly disposed spout 81 terminating closely adjacent the bed of the transverse conveying element. When the links 24 are upright, as indicated in full line, the bed engages the bottom of the spout to shut off the flow of material, and when the links 24 are inclined the material is fed in the proper direction to either of the other conveying elements.

FIGS. 8 to 12 are illustrative of many possible uses of the present invention made possible by the relative immobility of the conveying element, other than the amount of oscillation occasioned by the feeding movements.

Having illustrated and described preferred embodiments of the present invention, it will be readily apparent to those skilled in the art that the same permits of modifications in detail and arrangement. All such modifications as come within the true spirit and scope of the following claims are considered to be a part of our invention.

We claim:

1. A vibrating conveyor comprising a conveying element having an upwardly facing surface for receiving material to be conveyed, frame means supporting said conveying element for oscillating motion relative to said frame means and having a feeding component parallel to said surface, means connected to said conveying element for imparting such oscillating motion thereto, said frame means comprising a fixed frame adapted to be mounted upon a supporting structure and a subframe adjustably supported on said fixed frame for movement relative thereto in the direction of said feeding component, a plurality of upright, parallel links supporting said conveying element, said links having their lower ends pivotally connected to said subframe and their upper ends pivotally connected to said conveying element, means for effecting relative adjusting movement of said subframe with respect to said fixed frame in the direction of said feeding component to an extent that said links may be inclined from positions normal to said conveying element surface whereby adjustably to determine the amplitude and direction of said feeding component of oscillating motion, and resilient means between said fixed frame and said conveying element tending to hold said conveying element at substantially the same average horizontal position relative to said fixed frame.

2. A vibrating conveyor comprising a conveying element having an upwardly facing surface for receiving material to be conveyed, frame means supporting said conveying element for oscillating motion relative to said frame means and having a feeding component parallel to said surface, means connected to said conveying element for imparting such oscillating motion to the conveying element, a plurality of upright, parallel links supporting said conveying element on said frame means, said links having their upper ends pivotally connected to said conveying element and their lower ends pivotally connected to said frame means, means for effecting movement of said lower ends of said links with respect to said frame means in the direction of said feeding component to an extent that said links may be inclined in either direction from positions normal to said conveying element surface whereby adjustably to determine the amplitude and direction of said feeding component of oscillating motion, and resilient means between said frame means and said conveying element tending to hold conveying element at substantially the same average horizontal position relative to said fixed frame.

3. A vibrating conveyor comprising a conveying element having an upwardly facing surface for receiving material to be conveyed, frame means supporting said conveying element for oscillating motion relative to said frame means and having a feeding component parallel to said surface, a connecting rod extending in the direction of oscillating motion of said conveying element and having one end connected thereto, unbalanced rotor means supported for rotation about an axis at right angles to said connecting rod and connected to the other end of said connecting rod for imparting such oscillating motion to the conveying element, said frame means comprising a fixed frame supporting said unbalanced rotor means and a subframe adjustably supported on said fixed frame for movement relative thereto in the direction of said feeding component, a plurality of upright, parallel links supporting said conveying element, said links having their lower ends pivotally connected to said subframe and their upper ends pivotally connected to said conveying element, means for effecting relative adjusting movement of said subframe with respect to said fixed frame in the direction of said feeding component to an extent that said links may be inclined in either direction from positions normal to said conveying element surface whereby adjustably to determine the amplitude and direction of said feeding component of oscillating motion, and resilient means between said fixed frame and said conveying element tending to hold said conveying element at substantially the same average horizontal position relative to said fixed frame.

4. A vibrating conveyor comprising a conveying element having an upwardly facing surface for receiving material to be conveyed, frame means supporting said conveying element for oscillating motion relative to said frame means and having a feeding component parallel to said surface, a connecting rod extending in the direction of oscillating motion of said conveying element and having one end connected thereto, unbalanced rotor means supported for rotation about an axis at right angles to said connecting rod and connected to the other end of said connecting rod for imparting such oscillating motion to the conveying element, said frame means comprising a fixed frame supporting said unbalanced rotor means and a subframe adjustably supported on said fixed frame for movement relative thereto in the direction of said feeding component, a plurality of upright, parallel links supporting said conveying element, said links having their lower ends pivotally connected to said subframe and their upper ends pivotally connected to said conveying element, means for effecting relative adjusting movement of said subframe with respect to said fixed frame in the direction of said feeding component to an extent that said links may be inclined in either direction from positions normal to said conveying element surface whereby adjustably to determine the amplitude and direction of said feeding component of oscillating motion, and spring means imposed between said main frame and said conveying element for resisting motion of said conveying element in either direction of said feeding component of oscillating motion.

5. A vibrating conveyor comprising a conveying element having an upwardly facing surface for receiving material to be conveyed, frame means supporting said conveying element for oscillating motion relative to said frame means and having a feeding component parallel to said surface, a connecting rod extending in the direction of oscillating motion of said conveying element and having one end connected thereto, unbalanced rotor means supported for rotation about an axis at right angles to said connecting rod and connected to the other end of said connecting rod for imparting such oscillating motion to the conveying element, said frame means comprising a fixed frame supporting said unbalanced rotor means and a subframe adjustably supported on said fixed frame for movement relative thereto in the direction of said feeding component, a plurality of upright, parallel links supporting said conveying element, said links having their lower ends pivotally connected to said subframe and their upper ends pivotally connected to said conveying element, means for effecting relative adjusting movement of said subframe with respect to said fixed frame in the direction of said feeding component to an extent that said links may be inclined in either direction from positions normal to said conveying element surface whereby adjustably to determine the amplitude and direction of said feeding component of oscillating motion, and spring means imposed between said main frame and said conveying element for resisting motion of said conveying element in either direction of said feeding component of oscillating motion, said means for effecting relative adjusting movement of said subframe comprising piston and cylinder means between said fixed frame and said subframe and means for fixing the relative position of the piston and cylinder thereof.

6. A vibrating conveyor comprising a conveying element having an upwardly facing surface for receiving material to be conveyed, frame means supporting said conveying element for oscillating motion relative to said frame means and having a feeding component parallel to said surface, means connected to said conveying element for imparting such oscillating motion thereto, said frame means comprising a fixed frame adapted to be mounted upon a supporting structure and a subframe adjustably supported on said fixed frame for movement relative thereto in the direction of said feeding component, a plurality of upright, parallel links supporting said conveying element, said links having their lower ends pivotally connected to said subframe and their upper ends pivotally connected to said conveying element, means for effecting relative adjusting movement of said subframe with respect to said fixed frame in the direction of said feeding component to an extent that said links may be inclined in either direction from positions normal to said conveying element surface whereby adjustably to determine the amplitude and direction of said feeding component of oscillating motion, and resilient means between said fixed frame and said conveying element tending to hold said conveying element at substantially the same average horizontal position relative to said fixed frame, said means for effecting relative adjusting movement of said subframe comprising piston and cylinder means between said fixed frame and said subframe and means for fixing the relative position of the piston and cylinder thereof.

7. A vibrating conveyor comprising a conveying element having an upwardly facing surface for receiving material to be conveyed, frame means supporting said conveying element for oscillating motion relative to said frame means and having a feeding component parallel to said surface, means connected to said conveying element for imparting such oscillating motion to the conveying element, a plurality of upright, parallel links supporting said conveying element on said frame means, said links having their upper end pivotally connected to said conveying element and their lower ends pivotally connected to said frame means, means for effecting movement of said lower ends of said links with respect to said frame means in the direction of said feeding component to an extent that said links may be inclined in either direction from positions normal to said conveying element surface whereby adjustably to determine the amplitude and direction of said feeding component of oscillating motion, and resilient means between said frame means and said conveying element tending to hold said conveying element at substantially the same average horizontal position relative to said fixed frame, said means for effecting relative adjusting movement of said subframe comprising piston and cylinder means between said fixed frame and said subframe and means for fixing the relative position of the piston and cylinder thereof.

8. A vibrating conveyor comprising a conveying element having an upwardly facing surface for receiving material to be conveyed, frame means supporting said conveying element for oscillating motion relative to said frame means and having a feeding component parallel to said surface, means connected to said conveying element for imparting such oscillating motion thereto, said frame means comprising a fixed frame adapted to be mounted upon a supporting structure and a subframe adjustably supported on said fixed frame for movement relative thereto in the direction of said feeding component, a plurality of upright parallel links supporting said conveying element, said links having their lower ends pivotally connected to said subframe and their upper ends pivotally connected to said conveying element, opposed resilient means connecting the fixed frame and the conveyor element and tending to hold the conveyor element in a fixed horizontal position relative to the fixed frame and means for effecting relative adjusting movement of said subframe with respect to said fixed frame in the direction of said feeding component to an extent that said links may be inclined in either direction from positions normal to said conveying element surface whereby adjustably to determine the amplitude and direction of said feeding component of oscillating motion.

References Cited in the file of this patent

German printed application to Lieten, DAS, 1,047,708, December 24, 1958.